United States Patent [19]

Cholin et al.

[11] Patent Number: 4,712,096

[45] Date of Patent: Dec. 8, 1987

[54] CONDITION RESPONSIVE DETECTION SYSTEM AND METHOD

[75] Inventors: John M. Cholin, Oakland, N.J.; Jeffrey G. Cholin, Pound Ridge, N.Y.; Ray Voorhis, Midland Park, N.J.

[73] Assignee: Firetek Corporation, Hawthorne, N.J.

[21] Appl. No.: 732,875

[22] Filed: May 10, 1985

[51] Int. Cl.$^4$ ............................................. G08B 17/02
[52] U.S. Cl. ................................ 340/590; 350/96.29; 374/161
[58] Field of Search ............... 340/584, 590, 596, 589, 340/619; 374/130, 131, 161; 73/705; 250/231 R, 227, 577; 350/96.29–96.31; 356/73.1, 338, 340, 43–44

[56] References Cited

U.S. PATENT DOCUMENTS

| 4,151,747 | 5/1979 | Gottlieb et al. | 374/161 |
|---|---|---|---|
| 4,316,179 | 2/1982 | Bliss et al. | 340/589 X |
| 4,472,715 | 9/1984 | Kern et al. | 340/589 X |
| 4,515,474 | 5/1985 | Fox | 356/44 |
| 4,567,474 | 1/1986 | Wolin | 340/584 |

FOREIGN PATENT DOCUMENTS

| 2073439 | 10/1981 | United Kingdom | 374/161 |
|---|---|---|---|
| 2122337 | 1/1984 | United Kingdom | 374/161 |

*Primary Examiner*—Glen R. Swann, III
*Assistant Examiner*—Thomas J. Mullen, Jr.
*Attorney, Agent, or Firm*—W. Patrick Quast

[57] ABSTRACT

There is disclosed a condition responsive detection system and method comprising a length of optical fiber including a core-cladding material which has a modal dispersion ratio less than a predetermined number. The fiber is placed in the area to be monitored and is illuminated on one end by a source of radiant power. Electronic circuitry including a photocell are positioned at the receiving end of the fiber and detect when the radiant power transmitted by the fiber is reduced below a nominal level when the cladding material is altered, as for example by a fire or an overheat condition in the area being monitored. The reduction in radiant power received is due to the alteration of the cladding material such that the reflected radiant power is lost through the alteration in the material. The invention further comprises enhancing the sensitivity of the system by modifying the radiant power source in order to direct the emitted radiant power at an angle to the center line of the core thereby reducing the MDR of the fiber to less than a predetermined number. The circuitry at the receiving end of the fiber can detect a gradual reduction in the amount of radiant power received caused, for example, by the alteration of the cladding due to an overheat condition; as well as a relatively instantaneous reduction resulting from, perhaps, a fire. Additional circuitry provides for the detection of an abrupt cessation of transmission due to the breaking of the fiber, loss of power or otherwise.

18 Claims, 10 Drawing Figures

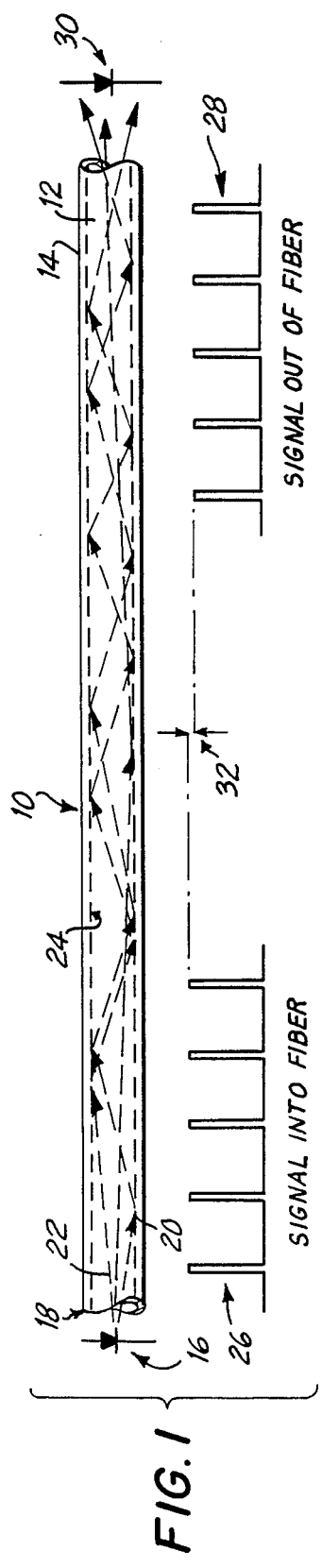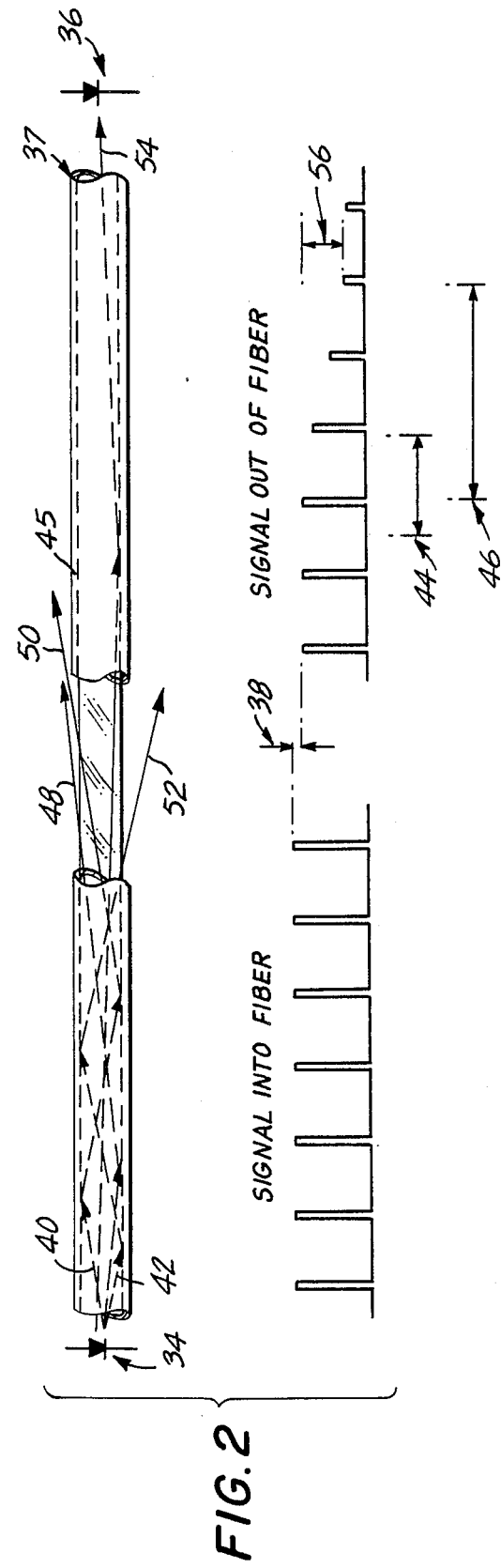

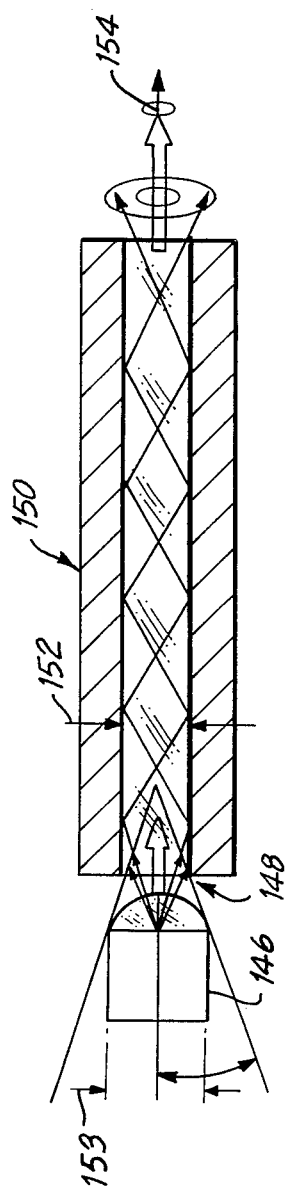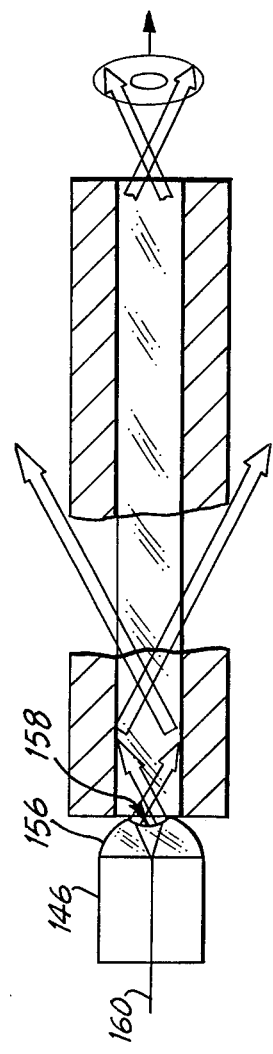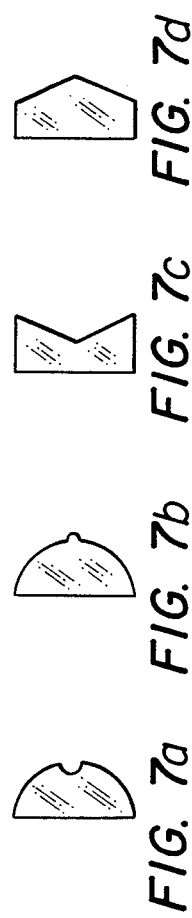

CONDITION RESPONSIVE DETECTION SYSTEM AND METHOD

TECHNICAL FIELD

This invention relates generally to a condition responsive detection and indicating system and more particularly a system for detecting and warning as to a fire and/or an overheat thermal condition.

BACKGROUND

Thermal fire detection has been achieved by a number of means over the years. Detectors are divided into two basic types: spot type and linear. The spot type detectors are individual devices which incorporate a small switching mechanism. These devices are mounted typically on the ceiling and wired to a control panel. They are most effective for the detection of fires in rooms, etc. However, there are many applications where the spot type detectors are not cost effective. Often the ability to detect a fire needs to be applied in spaces where the spot detector cannot be located or spread out over a specific area such as a cable tray, or engine housing. For this type of protection, linear detectors have been used.

Linear thermal detection has been available in three (3) technologies. The first is the thermistor cable. This is a coaxial cable which employs a negative temperature coefficient thermistor as the insulator between the outer and inner conductor. When the cable is heated the resistance of the thermistor decreases, and, therefore, the current between the core and jacket increases. This technology is expensive and requires an extremely sensitive electronic amplifier to generate useable data.

The second technology is the fusible insulation cable. This consists of two metallic conductors which are coated with thermoplastic insulation of specific melting point. The two insulated conductors are formed together into a twisted pair cable. When the temperature of the cable reaches the fusion temperature of the insulation, the latter melts and the residual spring tension of the wire forces the two conductors together resultino in a short circuit. This technology has one disadvantage in that once the insulation has melted that section of wire must be removed and replaced with a new section. Other problems include conductor fatigue, corrosion, R.F.I. susceptibility and dielectric breakdown.

The third technology employs pneumatic tube detection. This consists of a tube of thermoplastic material which contains a gas at elevated pressure. When the tubing reaches its fusion temperature due to fire or overheat condition the tube melts releasing the gas contained within. This causes a pressure reduction in the control unit precipitating the alarm and extinguishing agent discharge. These systems are also expensive to install and suffer from severe leakage problems.

Thus, there is an obvious need for a light weight, reliable, inexpensive linear thermal detection technique. None of the currently available techniques satisfy the needs of the industrial fire protection market. Such detection technique would ideally use a detection mode which could be placed along cable trays, engine housings, transformer shells, roller bearing mounts and the like to detect overheat conditions and fires. The sensing in the detection device must be flexible, light and reasonably strong. The detection device must also be resistant to vibration, attack by water and other solvents, and to electro-magnetic interference.

The present invention utilizes fiber optics to address certain of the problems experienced in this field in the past.

Particularly, this invention seeks to utilize optical fibers, plastic or fused silica core, in a novel fashion to detect changing environmental conditions as, for example, fire or an overheat condition. Plastic fibers are suitable for situations where relatively shortruns of fiber are acceptable—because of fairly high transmission losses (on the order of 300 dB per kilometer, e.g. robotic or engine applications. For larger more extensive hazard areas, e.g. conveyor systems, refinery columns, tanks, etc., the more efficient, silica core fibers are utilized (transmission loss of 10 dB per kilometer). However, in order to provide an adequate signal to noise ratio on longer length fibers, the modal dispersion ratio (MDR) of the fiber must be adjusted.

The MDR of a fiber refers to the ratio of the unreflected radiant power to the total radiant power introduced into the fiber—reflected and unreflected. "Reflected" radiant power refers to the internal reflection of the introduced radiant power which occurs at the core-cladding interface of the fiber.

For purposes of this invention, so-called multimode fibers, having a step-index construction (discrete interface between core and clad) are the better choice. These exhibit lower transmission losses and have much lower MDR's than the single mode, type fibers which have been developed and are designed to maximize the MDR.

Further, even though the multimode fiber is preferred over the single mode fiber, an improvement in the signal to noise ratio and thus the sensitivity of the fiber optic detector, is still required for many practical applications.

It is, therefore, a primary object of this invention to provide a condition responsive detector system which employs fiber optics.

It is also an object of this invention to provide a fire and thermal detector system which employs fiber optics.

It is yet another object of this invention to provide a fire and thermal detection system which utilizes multimode fibers having lower modal dispersion ratios relying on the melt-through of the cladding and the consequent loss of reflected radiant energy to detect fires and overheated conditions.

It is still another object of this invention to provide a means for increasing the reflections off the core-cladding interface to thus lower the MDR of the fiber optics as to further enhance the sensitivity of the system.

DISCLOSURE OF THE INVENTION

Towards the accomplishment of these and other objects and advantages which will become more apparent after a consideration of the following description, taken in conjunction with the accompanying drawings, there is disclosed a condition responsive detection system and method comprising a length of optical for including a core and cladding material which has a modal dispersion ratio less than a predetermined number. The fiber is placed in the area to be monitored and is illuminated on one end by a source of radiant power. Electronic circuitry including a photocell are positioned at the receiving end of the fiber and detect when the radiant power transmitted by the fiber is reduced below a nominal level when the cladding material is altered, as for example by a fire or an overheat condition in the area being monitored. The reduction in radiant power received is due to the alteration of the cladding material such that the reflected radiant power is lost through the alteration in the material. The invention further comprises enhancing the sensitivity of the system by modifying the radiant power source in order to direct the emitted radiant power at an angle to the center line of the core thereby reducing the MDR of the fiber to less than a predetermined number. The circuitry at the receiving end of the fiber can detect a gradual reduction in the amount of radiant power received caused, for example, by the alteration of the cladding due to an overheat condition; as well as a relatively instantaneous reduction resulting from, perhaps, a fire. Additional circuitry provides for the detection of an abrupt cessation of transmission due to the breaking of the fiber, loss of power or otherwise.

DESCRIPTION OF THE DRAWINGS

A full grasp of the invention, its advantages, benefits and other objectives will be more readily apparent from a reading of the following description taken in conjunction with the accompanying drawings.

FIG. 1 is a schematic view of an optical fiber depicting basic principles of optical fibers employed for the purposes of the invention.

FIG. 2 indicates the effect of deteriorating cladding material of the optical fiber on the reflected, transmitted radiant power.

FIG. 5 is a schematic, partial sectional view of a fiber and radiant power source in combination depicting a situation where the radiant power illuminating the front end of a fiber is restrained substantially along the center line of the fiber.

FIG. 6 depicts another aspect of the invention used to increase the amount of radiant power introduced at the source end of the fiber which is in fact reflected off the core-cladding interface.

FIGS. 7a-7d depicts various embodiments of the radiant power source lens which are employed to further increase the amount of incident radiant power energy which is available for reflections off the core-cladding interface.

DESCRIPTION OF THE BEST MODE

Figure 3:
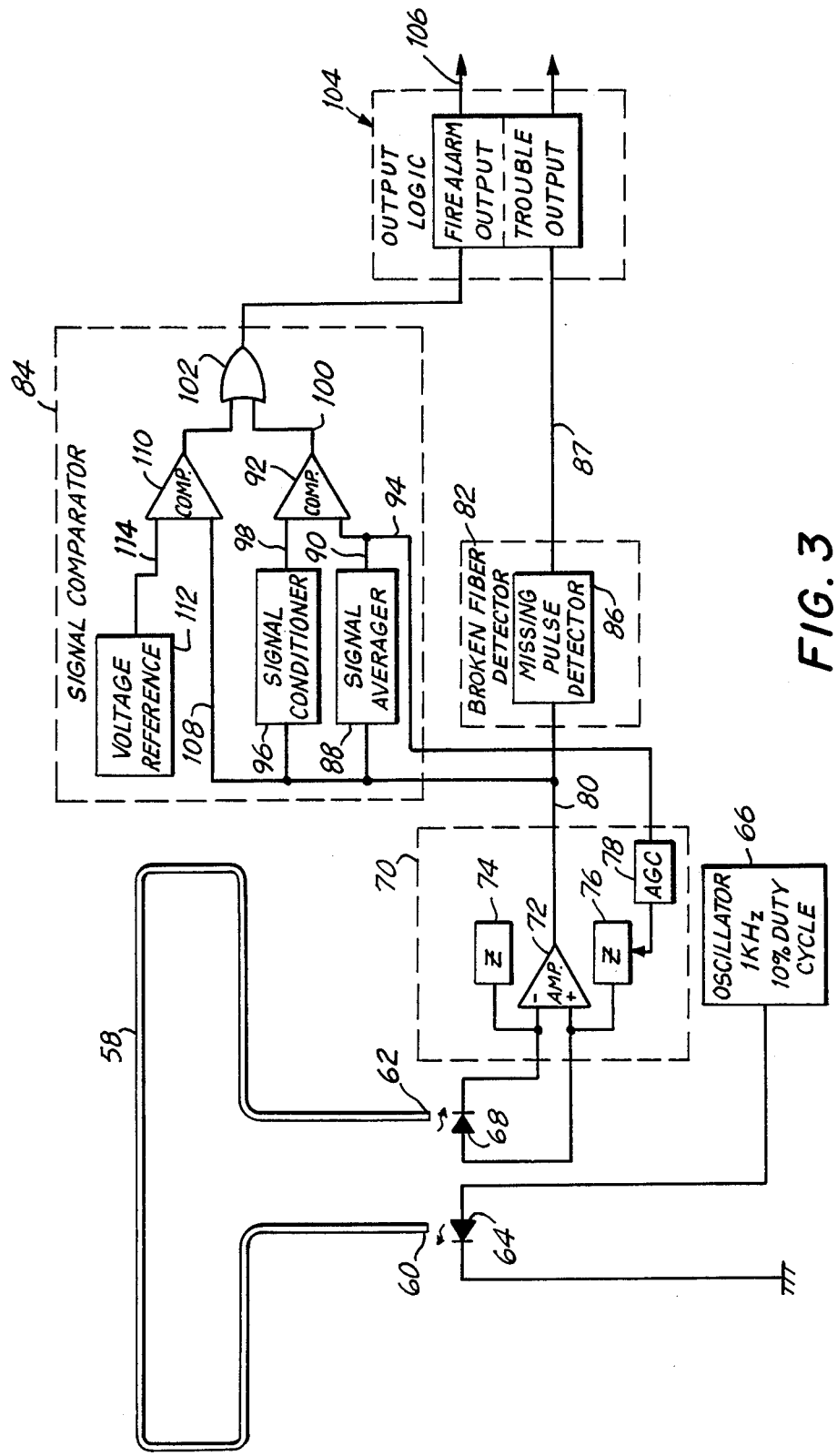
FIG. 3 is a block diagram of a system developed and employing the principles of the present invention.

FIG. 1 depicts in schematic form a fiber optic 10 comprising a plastic or fused silica core 12 having typically a plastic cladding material 14. The cladding material 14 for use of this invention as a fire or overheat detection system is typically a thermoplastic material of specific melting point, e.g. a melt temperature of 300° F. to 400° F.

A source of radiant power, 16, e.g. a light emitting diode (LED) illuminates a first end 18 of the fiber. The particular fiber selected for the purposes of the invention should have a modal dispersion ratio (MDR) low enough to ensure that the incident radiant power at the source end 18 results in sufficient reflections, 20 and 22, to accomplish the purposes of the invention. Simply stated, the greater the reflections, the more sensitive the detection system of the present invention becomes. In other words, an improved signal to noise ratio will result(and thus enhanced sensitivity of the system) if there is a greater proportion of the light reflected off the core-cladding interface 24, rather than transmitted through the core without reflections.

For a periodic energization of the LED 16, a typical radiant power signal into the illuminated end 18 of the fiber is shown at 26. For the circumstance where the cladding is intact the signal 28 depicting the received power at the detector 30 reflects a slight reduction in signal strength 32 due to normal transmission losses. The signal 28 becomes the reference or nominal level of this system.

FIG. 2 depicts what happens in accordance with the principles of the present invention, when there is an interruption in the cladding material surrounding the plastic or fused silica core of the fiber. Again, the optical fiber is one having a lower MDR. A radiant power or light source, LED 34, illuminates the source end of the fiber; while a photoconductive receiver, e.g. a photocell, 36, responds to the transmitted light or radiant power received at the receiver end 37. Under normal environmental conditions, once again, there is a minimal reduction in the transmitted signal as represented by difference 38. With the lower MDR type fiber, internal reflections, 40 and 42 occur. At the time of the fire, 44, the cladding material 45 in the immediate vicinity of the fire or overheated environment, begins to melt and deteriorate. Shortly thereafter at point 46, the signal received at the photocell 36 begins to lose its strength. As the cladding melts through or fuses with the core, the internally reflected light, at that point, now escapes from the fiber as depicted by rays 48, 50 and 52. Only a significantly smaller amount of light, represented by 54 continues through the fiber to be detected by the photocell 36. Thus, the increase in transmission loss 56 becomes indicative of an interruption in the cladding material.

Referring now to FIG. 3, the condition responsive detection and indicating system of the present invention is depicted in block diagram. A length of optical fiber 58 exhibiting a suitable MDR includes a first and second end, 60 and 62 respectively. The source or first end 60 is illuminated by a radiant power source means including a light emitting diode 64 which is driven, for example, by oscillator circuit 66. The latter provides regulated voltage pulses to the LED 64 at a predetermined frequency, e.g. 1 KHz, at a specified duty cycle, e.g. 10%. The LED illuminates the input end of the fiber.

The fiber is disposed throughout the area to be monitored. Whether the core is plastic or fused silica will depend on the extent of the area to be monitored given the relative transmission loss for each material.

Positioned at the second or receiving end 62 of the fiber is a means for detecting the level of light or radiant power transmitted by the fiber. Typically this would be a photocell 68 which converts the received light energy into an electronic signal having a nominal signal strength for an intact condition of the cladding material.

The signal emitted by the photocell is then processed by a signal amplifier circuit 70. This comprises one or more operational amplifiers 72 which include their respective gain determining impedances 74, 76. An automatic gain control circuit 78 is provided which samples the downstream signal providing an electronically filtered signal of suitable magnitude at the output 80 of the amplifier 70. The automatic gain control circuit compensates for differing signal levels out of the photocell reflective of varying fiber lengths, type and diameter.

For the oscillator driven radiant power source, the signal at the output of the signal amplifier 70 therefor will be a succession of voltage pulses which are proportional in magnitude to the radiant intensity emitted by the LED 64 and the transmission efficiency of the optical fiber 58. Thus, anything which reduces the transmission efficiency of the fiber 58 will cause a commensurate reduction in the signal maonitude at the output of the amplifier 70. At this point, the processed signal is then conveyed to two distinct circuit modules. These are a so-called broken fiber detector 82 and a signal comparator circuit 84. While the reduction in the light transmission will take place in a relatively short period of time for a broken fiber, the reduction of the signal transmission will occur more slowly due to the melting of the cladding. In a word, if the signal is lost perpipitously than it is due to breakage; while if it is lost gradually, as results from the melting of the cladding and ultimately the fiber core, the a fire or overheat condition is indicated. Desirably the system should indicate an alarm only in the latter circumstance and give an indication of a fault in the system when a break occurs.

The broken fiber detector 82 detects an abrupt cessation of the signal. There are several techniques for detecting this loss of continuous signal, e.g. a true missing pulse detector 86 which would produce a signal output on line 87 upon detecting the absence of a pulse or two caused by a break in the optical fiber. Another type of circuit suitable for this purpose would be a short time constant integrator which would likewise respond almost instantaneously to the absence of a pulse in the otherwise normal signal chain.

The signal comparator circuit 84 is designed to detect the relatively slow decrease of signal from the signal amplifier 70 which could reflect the gradual deterioration of the optical transmittance of the fiber 58 due to a fire. The are a number of methods of achieving this effect. Generally these involve a means of establishing an average of the magnitude of the nominal signal in a signal averaging circuit 88. The averager appearing on line 90 is supplied to a comparator 92. Also, the output of the averager is fed back on line 94 to an input of the AGC circuit 78 for the purpose of initializing the output of signal amplifier 70 to accommodate various fiber types, lengths or diameters.

A signal conditioning circuit 96 is connected to the output 80 of amplifier 70 as well. It produces at its output 98 a signal which is proportional to the actual signal received at the photocell at any oiven moment. The output on line 98 is suppliedto the other input of comparator 92. This will produce a signal change at its output 100 when the relative polarities of the sionals appearing at points 90 and 98 change. This occurs when the actual signal, as reflected at the output 98, is reduced, reflecting the change in the optical transmittance of the fiber, due to the loss of radiant power through the damaged cladding as caused by fire or overheat conditions.

The respective time constant of the signal averaging circuit 88 and the signal conditioning circuit 96 must be adjusted for the rate of signal decrease encountered during an overheat or fire condition. This is determined experimentally. Since the pulse rate of the oscillator 66, the fusion rate of the optical fiber 58, the time constant of the signal conditioner 96 and the time constant of the signal averaging circuit 88 are all related, it is apparent that these time constants must be adjusted for practical operation.

The output 100 of comparator 92 is supplied to a logic "or" gate 102. The output of the "or" gate is connected to output and logic circuitry 104 and through suitable circuit means provides an alarm output at 106 when a fire or overheat condition has been detected.

The signal appearing on the output 80 of amplifier 70 is also supplied via lead 108 to a second comparator 110. Voltage reference 112 provides a signal to the second input 114 of the comparator. Under a nominal condition, the voltage reference conditions the comparator so that the output level from the comparator through the "or" gate will not activate the alarm portion of the output logic. When the output of the signal amplifier 70 becomes non-varying with a magnitude larger than that of the voltage reference, indicating the luminescence temperature of the optical fiber 58 has been reached, because of a fire, the comparator changes state and once again through "or" gate 102 causes the output logic to indicate an alarm.

Figure 4:
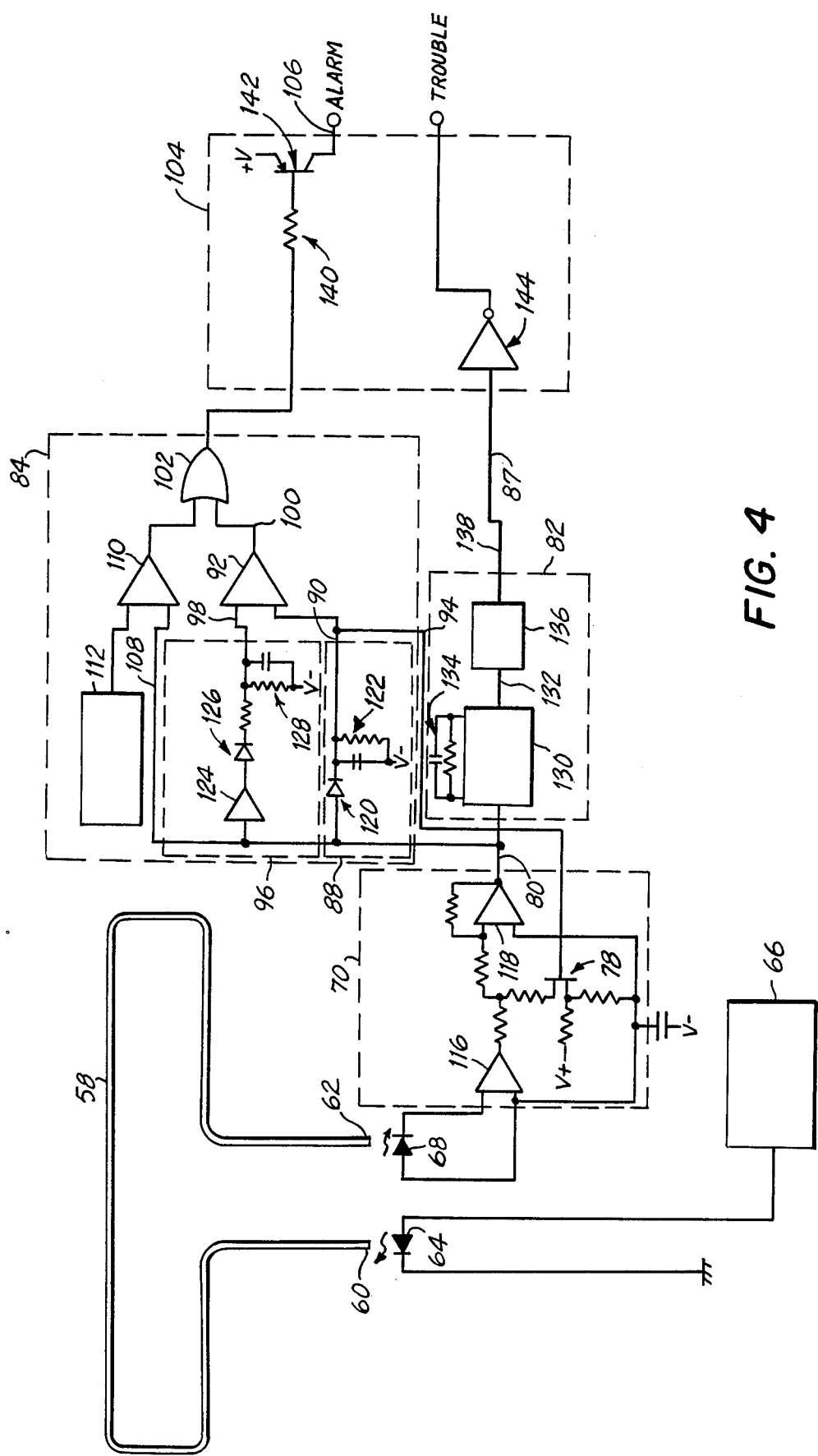
FIG. 4 is a schematic diagram of a detailed embodiment of the system depicted in FIG. 3.

FIG. 4 depicts possible detail circuitry for various black boxes as they appear in FIG. 3. Reference numerals as used in FIG. 4 to identify specific blocks which are identical to those in FIG. 3, are the same. From FIG. 4, it is seen that the signal amplifier 70 may include two operational amplifiers 116 and 118 as for example National Semiconductor Company's LM 324. Various resistors are disposed about the operational amplifiers in a known manner to effect the necessary gain of the circuit. The AGC circuit 78 may the implemented with a FET across the input to the second amplifier where the impedance level at that point is changed as a function of signal level appearing at the output 90 of the signal averaging circuit as.appropriate.

The signal comparator 84 and more particularly the signal averaging circuit 88 can be implemented with a half-wave rectifying circuit including diode 120 followed by a low pass filter network 122. The signal conditioner circuitry 96 can be implemented with a band pass filter circuit 124, the output of which is then peak rectified through diode 126 and low pass filter network 128.

As discussed above, the time constant of the averaging circuit and the signal conditioning circuit are adjusted based largely on experience and to accomplish the purposes of the invention.

The broken fiber detector 82, again, a missing pulse type detector, can be fashioned from a retriggerable multivibrator 130 whose output 132 is reset every time a pulse is received. If a pulse is missing, indicative of a break in the fiber, for example, the time constant established by circuitry 134 would cause the output at point 132 to change. The changed state at output 132 would be latched up by circuitry 136. The output 138 of the latched up circuitry is supplied to the output logic 104.

The output logic 104 can include alarm activating circuitry 140 including a transistor 142 connected between the power supply and suitable alarm means not shown. The "trouble" indicating circuitry might include necessary logic to make the system compatible with the external fire protection system control unit and might include an inverter 144 or other logic circuitry for that purpose.

As noted earlier, the potential for the present invention includes monitoring over extended areas as for example on conveyor systems, in refinery columns, tanks, etc. For these larger, more extensive monitored areas, a more efficient fiber is necessary.

The high efficiency fibers that are commercially available are all made with a fused silica core and silicon cladding. Since their transmission losses are on the order of 10 dB per kilometer, they can be used in applications requiring greater lengths of fiber. However, an adequate signal to noise ratio for such long lengths must be provided. Thus, the modal dispersion ratio has to be adjusted.

The modal dispersion ratio once again is the ratio of the radiant power that passes along the center of the fiber without reflections off of the core-cladding interface to the total radiant power introduced into the fiber, i.e.

$$MDR = k \frac{P_s}{P_s + P_m}$$

where k is a constant, $P_s$ is the single mode transmission of the fiber and $P_m$ is the multimode transmission factor of the fiber.

FIG. 5 shows the placement of the radiant power source, such as an LED, 146 adjacent the end 148 of a fused silica core-clad fiber optic 150. Although not shown to scale typically the diameter of the core portion of the fiber optic as identified by arrows 152 might be on the order of 0.2 mm, whereas the diameter 153 of the radiant power source such as an LED would be on the order of 5.0 mm. The radiant energy emitted by the LED enters the core of the fiber substantially parallel to its center line 154. Only a small number of the light rays incident on end 148 enter at an angle to the center line of the core of a magnitude sufficient to allow reflection. This is quantified in the figure by the size of the arrows indicating the relative difference between the rays along the center line 154 and those that are reflected. Thus, for a normal lens configuration of the LED the MDR for the high efficiency fiber optics is too high.

The reduction of the MDR is achieved for the purposes of the present invention by altering the generally hemispherical shape of the lens by introducing either a concavity in the lens 156 of the LED as depicted at point 158 or by otherwise creating a discontinuity in the surface of the LED lens. This having been done, what happens is that the light rays or radiant power are emitted from the diode at an angle to the center line 160 of the diode and system. Thus the quantity of light entering the fiber which is parallel to the axis of the fiber is reduced by redirecting it into an angular path. This is quantified in FIG. 6 through the use of arrows showing the relative magnitude of the light rays passing along the center line 160. In a word, the modal dispersion ratio now is reduced to a point where the efficacy of the longer length, higher efficiency type fibers is enhanced and thus quite suitable to the purposes of the present invention.

FIG. 7(a),(b),(c) and (d) just depict various ways the lens member of the radiant power source can be altered to provide for more emitted light rays at an angular path. These depressions or projections thus provide the requisite reduction of the MDR to improve system performance substantially.

Thus the combined feature of the altered radiant power source lens combined with the design disclosed above expands the potential of the present invention allowing it to use the inexpensive plastic fibers for small area applications, and permitting use of the more highly efficient silica core fibers in applications requiring longer lengths of fiber.

Although the invention has been described in terms of linear circuit elements, i.e. the circuit designs above, it should be readily apparent to those in the electronic circuit design art that the same results can be achieved with digital circuitry including a microprocessor and appropriate software. Still other alternatives to the linear circuit design depicted should likewise be apparent to those skilled in this art.

Although the present invention has been described as a fire and acute overheat condition, detection system, it has potentially broader application as a condition responsive system. Wherever errant environmental conditions can deteriorate the cladding material, to the point that reflected radiant power is lost through the damaged cladding, the described system will provide a suitable monitor.

While a preferred embodiment has been described, the scope of the invention, of course, is only limited by the breadth of the appended claims.

What is claimed is:

1. A condition responsive detection system for detecting the occurrence of a predetermined errant environmental condition, comprising
    (a) a length of optical fiber having a first and second end, said length of optical fiber including a core and core-cladding material, said cladding material reflecting the radiant power incident thereon, said optical fiber selectively chosen to include a cladding material whose chemical structure irreversibly deteriorates upn exposure to the errant environmental condition sought to be monitored, the irreversible deterioration resulting in the otherwise incident and reflected radiant power to be lost therethrough, said optical fiber having a modal dispersion ratio (MDR) less than a predetermined number to maximize the radiant reflectively incident on said cladding material;
    (b) radiant power source means for illuminating said first end; and
    (c) means, disposed at the second end, for detecting the reduction in the amount of radiant power received a the second end, below a nominal level, when the chemical structure of said cladding material is irreversibly altered such that substantially all of the reflected radiant power is lost through the alteration in the cladding material.

2. A condition responsive detection system for detecting the occurrence of a predetermined errant environmental condition, comprising
    (a) a length of optical fiber having a first and second end and center line, said length of optical fiber including a core and core-cladding material, said cladding material reflecting the radiant power incident thereon, said optical fiber selectively chosen to include a cladding material whose chemical structure irreversibly deteriorates upon exposure to the errant envioronmental condition sought to be monitored, the irreversible deterioration resulting in the otherwise incident and reflected radiant power to be lost therethrough said optical fiber having a certain modal dispersal ratio (MDR);
    (b) radiant power source means for illuminating said first end, said radiant power source means including an optical member for directing radiant power into the core of said optical fiber;

(c) means for redirecting the radiant power, emitted from said radiant power source means at an angle to the center line of said core of said optical fiber, whereby the MDR of said fiber is reduced to or less than a predetermined number to maximize the radiant power reflectively incident on said cladding material; and (d) means, disposed at the second end, for detecting the reduction in the amount of radiant power received at the second end, below a nominal level, when the chemical structure of said cladding material is irreversibly altered such that substantially all of the reflected radiant power is lost through the alteration in the cladding material.

3. The system claimed in either claim 1 or claim 2 wherein said means disposed at the second end include first circuit means, responsive to the detected reduction in the amount of radiant power received, for indicating the fact of said reduction.

4. The system claimed in claim 3 wherein said means disposed at the second end include a second circuit means for detecting a relatively gradual reduction in the amount of radiant power received caused by the gradual deterioration of the cladding material due to the condition to be detected.

5. The system claimed in claim 4 wherein said means disposed at the second end include a third circuit means for detecting a relatively fast reduction in the amount of radiant power received caused by the relatively quick deterioration of the cladding material caused by the condition to be detected.

6. The system claimed in claim 5 wherein said means disposed at the second end include a fourth circuit means for detecting an abrupt cessation in the amount of radiant power received caused by the breaking of the fiber, loss of power to said radiant power soruce means, etc.; and fifth circuit means for indicating the detected abrupt cessation.

7. The system claimed in claim 4 wherein said means disposed at the second end include sixth circuit means for controlling the gain of the means disposed at the second end to compensate for different type optical fibers, fiber diameter, fiber length, etc.

8. The system claimed in claim 4 wherein the condition to be detected is a fire or an overheat condition.

9. The system claimed in claim 8 wherein the cladding material has a predetermined fusion temperature.

10. The system claimed in claim 4 wherein said optical fiber is a step-index fiber.

11. The system claimed in claim 2 wherein said radiant power source means includes a light emitting diode having a lens portion, said optical member consisting of said lens portion, said means for redirecting the radiant power emitted by said radiant power source means including an altered surface of said lens portion.

12. A method for monitoring a fire, an acute overheat condition, or certain other environmentally errant conditions comprising the steps of:
(a) selecting a type of optical fiber having a modal dispersion ratio (MDR) less then a predetermined number, said fiber having a first and second end and including a core and core-cladding material, said cladding material reflecting the radiant power incident thereon said optical fiber selection further being determined by said cladding material having a chemical structure which irreversibly deteriorates upon exposure to the errant environmental condition sought to be monitored, the irreversible deterioration resulting in the otherwise incident and reflected radiant power being lost therethrough;

(b) placing a length of said optical fiber in and about the area to be monitored;

(c) illuminating said first end by a radiant power source means; and (d) detecting the reduction in the amount of radiant power received at the second end, below a nominal level, due to the irreversible altering of the cladding material by the occurrence of the environmental condition(s) to be monitoed and the consequent loss of reflected radiant power through the alteration in the cladding material.

13. A method for monitoring a fire, an cute overheat condition, or certain other environmentally errant conditions comprising the steps of:
(a) selecting a type of optical fiber having a certain modal dispersion ratio (MDR), said fiber having a first and second end and center line and including a core and core-cladding material, said cladding material reflecting the radiant power incident thereon said optical fiber selection further being determined by said cladding material having a chemical structure which irreversibly deteriorates upon exposure to the errant environmental condition sought to be monitored, the irreversible deterioration resulting in the otherwise incident and reflected radiant power being lost therethrough;

(b) placing a length of said optical fiber in and about the area to be monitored;

(c) illuminating said first end by a radiant power source means;

(d) redirecting the radiant power, emitted from said radiant power source means, at an angle to the center line of said core and fiber at the point of entering the core of said fiber, whereby the MDR of said fiber is reduced; and (e) detecting the reduction in the amount of radiant power received at the second end, below a nominal level, due to the irreversible altering of the cladding matterial by the occurrence of the environmental condition(s) to be monitoed and the consequent loss of reflected radiant power through the alteration in the cladding material.

14. The method claimed in claim 12 further comprising the step of indicating the fact of detecting said reduction in amount of radiant power.

15. The method claimed in claim 13 further comprising the step of indicating the fact of detecting said reduction in amount of radiant power.

16. The method claimed in either claims 12, 13, 14 or 15 wherein the step of detecting includes differentiating between a relatively gradual reduction in the amount of radiant power received due to a condition to be detected and a relatively fast reduction due to a condition to be detected.

17. The method claimed in claim 16 wherein the step of detecting includes detecting an abrupt cessation in the amount of radiant power received caused by the breaking of the fiber, loss of power to said radiant power source means, etc., and the further step of indicating the fact of this abrupt cessation.

18. The method claimed in claim 16 wherein the radiant power source means includes an optical member, said method further including the step of altering the shape of the optical member whereby the radiant power, emitted from said radiant power source means, is redirected at an angle to the center line of said core and fiber at the point of entering the core of said fiber whereby the MDR of said fiber is reduced.

* * * * *